(12) United States Patent
Tsai et al.

(10) Patent No.: US 7,654,885 B2
(45) Date of Patent: Feb. 2, 2010

(54) MULTI-LAYER POLISHING PAD

(75) Inventors: Stan D. Tsai, Fremont, CA (US);
Shou-Sung Chang, Los Altos, CA (US);
Liang-Yuh Chen, Foster City, CA (US)

(73) Assignee: Applied Materials, Inc., Santa Clara, CA (US)

(*) Notice: Subject to any disclaimer, the term of this patent is extended or adjusted under 35 U.S.C. 154(b) by 307 days.

(21) Appl. No.: 10/956,617

(22) Filed: Oct. 1, 2004

(65) Prior Publication Data
US 2005/0098446 A1    May 12, 2005

Related U.S. Application Data

(60) Provisional application No. 60/508,321, filed on Oct. 3, 2003.

(51) Int. Cl.
*B24B 29/00* (2006.01)

(52) U.S. Cl. .............. 451/288; 451/290; 451/527; 451/533; 451/540

(58) Field of Classification Search .............. 451/36, 451/41, 59, 63, 288, 290, 527, 533, 539, 451/548, 550
See application file for complete search history.

(56) References Cited

U.S. PATENT DOCUMENTS

| | | | |
|---|---|---|---|
| 3,499,250 A | 3/1970 | Jensen et al. | |
| 3,504,457 A | 4/1970 | Jacobsen et al. | |
| 4,512,113 A | 4/1985 | Budinger | |
| 4,879,258 A | 11/1989 | Fisher | |
| 5,177,908 A | 1/1993 | Tuttle | |
| 5,257,478 A | 11/1993 | Hyde et al. | |
| 5,433,651 A | 7/1995 | Lustig et al. | |
| 5,489,233 A | 2/1996 | Cook et al. | |
| 5,791,975 A | 8/1998 | Cesna et al. | |
| 5,893,796 A | 4/1999 | Birang et al. | |
| 5,921,855 A | 7/1999 | Osterheld et al. | |
| 6,068,539 A | 5/2000 | Bajaj et al. | |
| 6,135,856 A * | 10/2000 | Tjaden et al. | 451/37 |
| 6,146,248 A | 11/2000 | Jairath et al. | |
| 6,306,021 B1 * | 10/2001 | Masumura et al. | 451/287 |
| 6,328,642 B1 | 12/2001 | Pant et al. | |

(Continued)

FOREIGN PATENT DOCUMENTS

TW    200404648    4/2004

OTHER PUBLICATIONS

Taiwan Patent Examiner, Official Letter of Pending Patent Application, Apr. 17, 2009, Taiwan Patent Office (office action for Taiwanese Application No. 95103206).

(Continued)

*Primary Examiner*—Timothy V Eley
(74) *Attorney, Agent, or Firm*—Fish & Richardson A

(57) ABSTRACT

A polishing pad has a polishing layer and a backing layer secured to the polishing layer. The polishing layer has a polishing surface, a first thickness, a first compressibility, and a hardness between about 40 to 80 Shore D. The backing layer has a second thickness greater than the first thickness and a second compressibility greater than the first compressibility. The first thickness, first compressibility, second thickness and second compressibility are such that the polishing surface deflects at least 2 mil under an applied pressure of 1 psi or less.

22 Claims, 3 Drawing Sheets

U.S. PATENT DOCUMENTS

| | | | |
|---|---|---|---|
| 6,354,915 B1 | 3/2002 | James et al. | |
| 6,358,130 B1 | 3/2002 | Freeman et al. | |
| 6,390,891 B1 | 5/2002 | Guha et al. | |
| 6,402,591 B1 | 6/2002 | Thornton | |
| 6,406,363 B1 | 6/2002 | Xu et al. | |
| 6,406,591 B1 | 6/2002 | Beckstrom et al. | |
| 6,475,332 B1 | 11/2002 | Boyd et al. | |
| 6,488,575 B2 * | 12/2002 | Agarwal et al. | 451/527 |
| 6,517,426 B2 | 2/2003 | Lee | |
| 6,524,164 B1 | 2/2003 | Tolles | |
| 6,537,144 B1 | 3/2003 | Tsai et al. | |
| 6,551,179 B1 | 4/2003 | Halley | |
| 6,561,873 B2 | 5/2003 | Tsai et al. | |
| 6,561,889 B1 | 5/2003 | Xu et al. | |
| 6,572,463 B1 | 6/2003 | Xu et al. | |
| 6,612,917 B2 * | 9/2003 | Bruxvoort | 451/533 |
| 6,620,036 B2 | 9/2003 | Freeman et al. | |
| 6,632,129 B2 * | 10/2003 | Goetz | 451/533 |
| 6,638,143 B2 * | 10/2003 | Wang et al. | 451/41 |
| 6,705,934 B1 * | 3/2004 | Shiro et al. | 451/526 |
| 6,848,974 B2 * | 2/2005 | Hasegawa et al. | 451/41 |
| 6,855,034 B2 * | 2/2005 | Hasegawa | 451/41 |
| 6,884,156 B2 * | 4/2005 | Prasad et al. | 451/533 |
| 6,887,136 B2 | 5/2005 | Smith | |
| 6,893,337 B2 | 5/2005 | Carlson | |
| 6,905,402 B2 * | 6/2005 | Allison et al. | 451/533 |
| 6,913,517 B2 | 7/2005 | Prasad | |
| 6,935,931 B2 * | 8/2005 | Prasad | 451/41 |
| 6,960,120 B2 * | 11/2005 | Prasad | 451/41 |
| 6,960,521 B2 * | 11/2005 | Moon et al. | 438/633 |
| 7,112,121 B2 * | 9/2006 | Lee et al. | 451/41 |
| 7,132,070 B2 * | 11/2006 | Shih et al. | 264/51 |
| 7,192,340 B2 * | 3/2007 | Ono et al. | 451/526 |
| 2001/0005667 A1 | 6/2001 | Tolles et al. | |
| 2002/0004357 A1 | 1/2002 | Baker, III et al. | |
| 2002/0102853 A1 | 8/2002 | Li et al. | |
| 2002/0119286 A1 | 8/2002 | Chen et al. | |
| 2002/0193054 A1 | 12/2002 | Smith | |
| 2003/0209448 A1 | 11/2003 | Hu et al. | |
| 2003/0213703 A1 | 11/2003 | Wang et al. | |
| 2003/0220053 A1 | 11/2003 | Manens et al. | |
| 2004/0020789 A1 | 2/2004 | Hu et al. | |
| 2004/0023610 A1 | 2/2004 | Hu et al. | |
| 2004/0121708 A1 | 6/2004 | Hu et al. | |

OTHER PUBLICATIONS

China Patent Examiner, Notice on the First OA, Mar. 16, 2009, Chinese Patent Office (office action for Chinese Application No. 200710167020.8).

* cited by examiner

MULTI-LAYER POLISHING PAD

CROSS-REFERENCE TO RELATED APPLICATIONS

This application claims priority to U.S. Provisional Application Ser. No. 60/508,321, filed on Oct. 3, 2003.

BACKGROUND

This present invention relates to polishing pads used in during chemical mechanical polishing.

An integrated circuit is typically formed on a substrate by the sequential deposition of conductive, semiconductive or insulative layers on a silicon wafer. One fabrication step involves depositing a filler layer over a non-planar surface, and planarizing the filler layer until the non-planar surface is exposed. For example, a conductive filler layer can be deposited on a patterned insulative layer to fill the trenches or holes in the insulative layer. The filler layer is then polished until the raised pattern of the insulative layer is exposed. After planarization, the portions of the conductive layer remaining between the raised pattern of the insulative layer form vias, plugs and lines that provide conductive paths between thin film circuits on the substrate. In addition, planarization is needed to planarize the substrate surface for photolithography.

Chemical mechanical polishing (CMP) is one accepted method of planarization. This planarization method typically requires that the substrate be mounted on a carrier or polishing head. The exposed surface of the substrate is placed against the polishing surface of a polishing pad, such as a rotating polishing disk or linearly advancing belt. The carrier head provides a controllable load on the substrate to push it against the polishing pad. A polishing liquid, which can include abrasive particles, is supplied to the surface of the polishing pad, and the relative motion between the substrate and polishing pad results in planarization and polishing.

Conventional polishing pads include "standard" pads and fixed-abrasive pads. A standard pad has a polyurethane polishing layer with a durable roughened surface, and can also include a compressible backing layer. In contrast, a fixed-abrasive pad has abrasive particles held in a containment media, and can be supported on a generally incompressible backing layer.

One objective of a chemical mechanical polishing process is polishing uniformity. If different areas on the substrate are polished at different rates, then it is possible for some areas of the substrate to have too much material removed ("overpolishing") or too little material removed ("underpolishing").

SUMMARY

In one aspect, the invention is directed to a polishing pad with a polishing layer and a backing layer secured to the polishing layer. The polishing layer has a polishing surface, a first thickness, a first compressibility, a hardness between about 40 to 80 Shore D, and a thickness non-uniformity. The backing layer has a second thickness greater than the first thickness and a second compressibility greater than the first compressibility. The first thickness, first compressibility, second thickness and second compressibility are such that the polishing surface deflects more than the thickness non-uniformity of the polishing layer at an applied pressure of 1 psi or less.

Implementations of the invention may include one or more of the following features. The polishing surface may deflect at least 2 mil under an applied pressure of 0.5 psi or less, such as 0.3 psi or less, e.g., about 0.1 psi. A product of the second compressibility and second thickness of the backing layer nay be at least 2 mils at a pressure of 0.8 psi or less. The backing layer may have a hardness of 20 Shore A or less. The backing layer may have a second thickness greater than 80 mils, such as between about 90 and 150 mils, and the polishing layer may have a thickness less than 50 mils, such as 40 mils or less, or 25 mils or less. A plurality of grooves may be formed in the polishing surface, a recess may be formed in a bottom surface of the polishing layer, an aperture may be formed in the backing layer aligned with the recess, a fluid-impermeable layer may be between the polishing layer and the backing layer, a metal sheet may be secured to the backing layer on a side opposite the polishing layer, and a plurality of holes may be formed through the polishing layer and the backing layer to expose the metal sheet. The polishing layer may include polyurethane, e.g., cast polyurethane with embedded hollow microspheres.

In another aspect, the invention is directed to a polishing pad with a polishing layer having a polishing surface, a hardness between about 40 and 80 Shore D, and a thickness of about 25 mils or less, and a backing layer secured to the polishing layer. The backing layer is more compressible than the polishing layer and has a thickness between about 90 and 150 mils.

Implementations of the invention may include one or more of the following features. The backing layer may have a thickness of about 95 mils or a thickness of about 125 mils. The backing layer may have compressibility 2% or more at 0.5 psi.

In another aspect, the invention is directed to a polishing pad with a polishing layer having a polishing surface, a hardness between about 40 and 80 Shore D, a first compressibility and a first thickness, and a backing layer secured to the polishing layer. The backing layer has a second compressibility greater than the first compressibility and a second thickness of 90 mils or more. The backing layer further has a product of the second thickness and second compressibility of 2 mils or more, and the ratio of the second thickness to the first thickness is between about 4.5 and 8.

In another aspect, the invention is directed to a method of chemical mechanical polishing that includes bringing a substrate into contact with a polishing surface of a polishing layer of a polishing pad, supplying a polishing liquid to the polishing surface, creating relative motion between the substrate and the polishing surface, and applying a pressure to the substrate to press the substrate against the polishing pad at an applied pressure of 1 psi or less. The polishing layer has a first thickness, a first compressibility, a hardness between about 40 to 80 Shore D, and a thickness non-uniformity, and is secured to a backing layer having a second thickness greater than the first thickness and a second compressibility greater than the first compressibility. The first thickness, first compressibility, second thickness and second compressibility are such that the polishing surface deflects more than the a thickness non-uniformity of the polishing layer under the applied pressure.

Implementations of the invention may include one or more of the following features. The applied pressure may be 0.5 psi or less, such as 0.3 psi or less, e.g., about 0.1 psi.

In another aspect, the invention is directed to a method of electrochemical processing that includes bringing a substrate into contact with a surface of a covering layer of a processing pad, supplying an electrolyte to the surface, creating relative motion between the substrate and the surface, applying a bias between a cathode exposed to the electrolyte and the substrate, and applying a pressure to the substrate to press the substrate against the processing pad at an applied pressure of 1 psi or less. The covering layer has a first thickness, a first compressibility, a hardness between about 40 to 80 Shore D, and a thickness non-uniformity, and is secured to a backing layer having a second thickness greater than the first thickness and a second compressibility greater than the first compressibility. The first thickness, first compressibility, second thickness and second compressibility are such that the polishing surface deflects more than the thickness non-uniformity of the covering layer under the applied pressure.

Implementations of the invention may include one or more of the following features. Applying the bias may include contacting the substrate with an electrical contact that extends through the polishing pad. The polishing pad may include a metal sheet secured to the backing layer on a side opposite the polishing layer and a plurality of holes formed through the polishing layer and the backing layer to expose the metal sheet, and applying the bias may include applying a bias between the electrical contact and the metal sheet. The applied pressure may be 0.5 psi or less, such as 0.3 psi or less, e.g., about 0.1 psi.

In another aspect, the invention is directed to a substrate processing apparatus with a pad support, a processing pad held by the pad support, a carrier head to hold a substrate in contact with the processing pad, a supply of processing fluid, and a motor connected to at least one of the pad support and the carrier head to cause relative motion between the processing pad and the substrate. The processing pad has a covering layer with an exposed surface, a first thickness, a first compressibility, a hardness between about 40 to 80 Shore D, and a thickness non-uniformity, and a backing layer secured to the covering layer. The backing layer has a second thickness greater than the first thickness and a second compressibility greater than the first compressibility. The first thickness, first compressibility, second thickness and second compressibility are such that the exposed surface deflects more than the thickness non-uniformity of the polishing layer at an applied pressure of 1 psi or less.

Implementations of the invention may include one or more of the following features. An electrode may be positioned to contact the substrate, a cathode may contact the polishing fluid, and a power supply may be coupled between the electrode and the cathode to create a bias.

In another aspect, the invention is directed to a processing pad with a covering layer and a backing layer secured to the covering layer. The covering layer has an outer surface, a first thickness, a first compressibility, a hardness between about 40 to 80 Shore D, and a thickness non-uniformity. The backing layer having a second thickness greater than the first thickness and a second compressibility greater than the first compressibility. The first thickness, first compressibility, second thickness and second compressibility are such that the exposed surface deflects, under an applied pressure of 1 psi or less, more than the thickness non-uniformity of the covering layer.

In another aspect, the invention is directed to a processing pad with a covering layer and a backing layer secured to the covering layer. The covering layer has an outer surface, a first thickness, a first compressibility, a hardness between about 40 to 80 Shore D, and a thickness non-uniformity. The backing layer having a second thickness greater than the first thickness and a second compressibility greater than the first compressibility. The first thickness, first compressibility, second thickness and second compressibility are such that the exposed surface deflects sufficiently, under an applied pressure of 1 psi or less from a substantially planar substrate, that the outer surface remains in substantially uniform contact with the substrate across the substrate surface.

In another aspect, the invention is directed to a processing pad that has a covering layer and a backing layer secured to the covering layer. The covering layer has an outer surface, a first thickness, a first compressibility, a hardness between about 40 to 80 Shore D, and a thickness non-uniformity. The backing layer has a second thickness greater than the first thickness and a second compressibility greater than the first compressibility. The first thickness, first compressibility, second thickness and second compressibility are such that the polishing surface deflects sufficiently, under an applied pressure of 1 psi or less, to substantially compensate for the thickness non-uniformity of the polishing layer.

Any of the various implementations discussed above are also applicable to any of the various aspects of the invention.

Potential advantages of the invention may include one or more of the following. Polishing uniformity across the substrate may be improved, particularly at low pressures such as below 0.8 psi, or even below 0.5 psi or 0.3 psi. Consequently, materials that require low-pressure polishing to avoid delamination, such as low-k dielectric materials, can be polished with an acceptable degree of uniformity.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
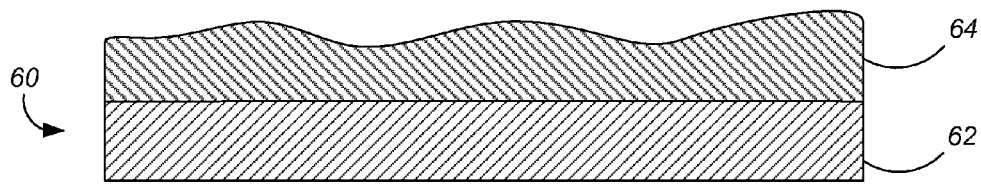
FIG. 1A is a schematic cross-sectional side view illustrating a conventional polishing pad.

As mentioned above, and referring to FIG. 1A, a conventional polishing pad 60 can have a polyurethane covering layer 64 with a durable rough polishing surface 66 and a compressible backing layer 62 with about the same thickness as the covering layer. In addition, there may be small variations in the thickness of the covering layer 64, e.g., on the order of about 1-2 mil, across the polishing pad (for clarity, the variations are significantly exaggerated in FIG. 1A).

For example, one polishing pad commercially available from Rodel, Inc., has a covering layer formed of polyurethane with embedded hollow microspheres (IC1000) and a backing layer formed of polyurethane impregnated polyester felt (Suba IV). The covering layer has a thickness of 50 or 80 mils and a hardness of 52-62 on the Shore D scale, whereas the backing layer has a thickness of 50 mils and a hardness of about 61 on the Shore A scale.

Figure 1B:
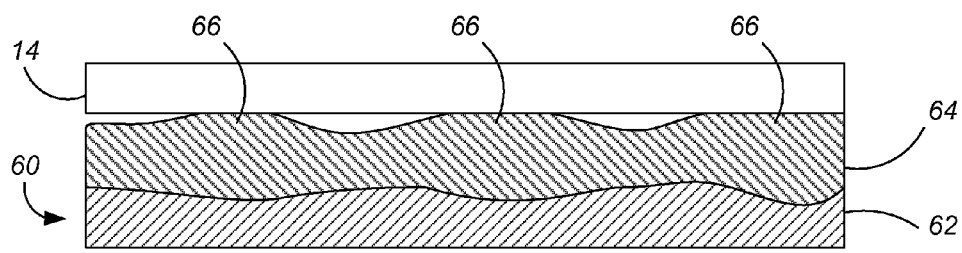
FIG. 1B is a schematic cross-sectional side view illustrating a substrate in contact with the polishing pad of FIG. 1A.

Unfortunately, the conventional polishing pad can result in unacceptable polishing uniformity at low pressures, e.g., below 1.0 psi, and particularly at very low pressures, e.g., below 0.5 psi. Without being limited to any particular theory, it may be that the dimensions and physical properties of the standard polishing pad are such that, at low polishing pressures, the backing layer remains rigid enough that the downward pressure of the substrate 14 is not sufficient to completely "flatten out" the covering layer. Consequently, as shown in FIG. 1B, any thickness variation in the covering layer 64 results in pressure being transmitted to the substrate in only the thick portions 66 of the covering layer 64, thus causing the non-uniformity in the polishing rate.

In contrast to these conventional polishing pads, an implementation of the polishing pad of the present invention has a thinner covering layer and a thicker and more compressible backing layer. Again without being limited to any particular theory, the reduced thickness of the covering layer makes it easier to deflect. Similarly, the increased thickness and compressibility of the backing layer make the covering layer easier to deflect. As a result, even at very low polishing pressures, the covering layer can be flattened out so that thickness variations in the covering layer do not adversely impact the polishing uniformity.

Figure 2:
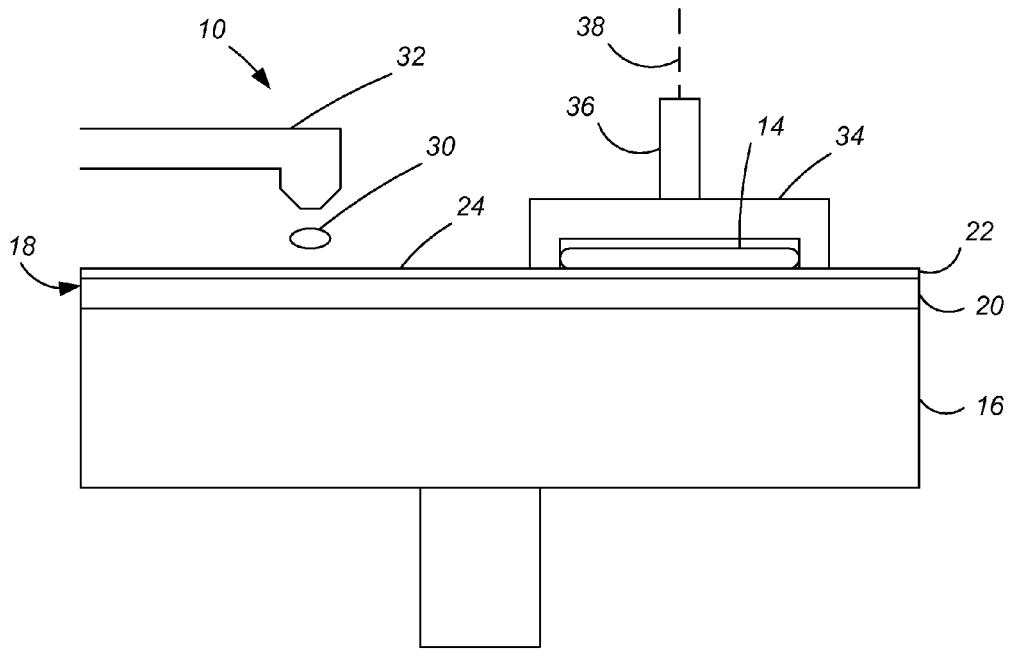
FIG. 2 is a schematic side view, partially cross-sectional, of a chemical mechanical polishing station.

Turning now to FIG. 2, one or more substrates 14 can be polished at a polishing station 10 of a CMP apparatus. A description of a suitable polishing apparatus can be found in U.S. Pat. No. 5,738,574, the entire disclosure of which is incorporated herein by reference.

The polishing station 10 includes a rotatable platen 16 on which is placed a polishing pad 18. As described below, the polishing pad 18 is a two-layer polishing pad with a soft backing layer 20 and a hard durable outer layer 22 with a substantially uniform composition. The durable outer covering layer 22 provides a polishing surface 24. The polishing station can also include a pad conditioner apparatus to maintain the condition of the surface of the polishing pad so that it will effectively polish substrates.

During a polishing step, a polishing fluid 30, e.g., a slurry, can be supplied to the surface of polishing pad 18 by a slurry supply port or combined slurry/rinse arm 32. Slurry 30 can contain abrasive particles, a pH adjuster, or chemically active components.

The substrate 14 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38.

Figure 3A:
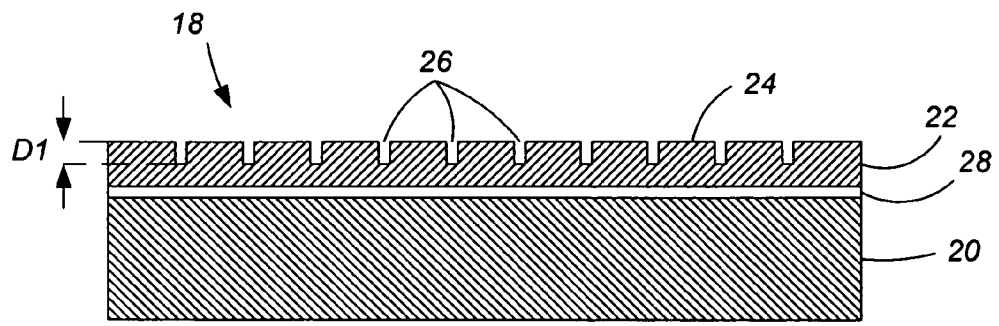
FIG. 3A is a schematic cross-sectional side view illustrating the polishing pad of FIG. 2.

Referring to FIG. 3A, the covering layer 22 of the polishing pad 18 is a relative durable and hard polishing material that is inert in the polishing process, e.g., a cast polyurethane. For example, the covering layer 22 can have a hardness of about 40 to 80, e.g., 50 to 65, on the Shore D scale. The polishing surface 24 of the covering layer 22 can have rough surface texture, e.g., hollow microspheres can be embedded in the polyurethane so that when the covering layer is skived from a cast polyurethane block, the microspheres at the exposed surface are ruptured to provide a pitted and rough surface texture.

The covering layer 22 is thin, e.g., less than 50 mils, such as 40 mils or less, or 25 mils or less, or 20 mils or less, or 15 mils or less. In general, the covering layer 22 is as thin as possible, subject to manufacturability. However, the conditioning process tends to wear away the cover layer. Therefore, a thickness of the covering layer can be selected to provide the polishing pad with a useful lifetime, e.g., 3000 polishing and conditioning cycles. For example, the covering layer can have a thickness of 5 to 10 mils. A thickness between about 5 and 20 mils should be appropriate. There may be thickness non-uniformities across the pad of about 1-3 mils, although larger non-uniformities are possible (these non-uniformities refer to the global variations in thickness across the polishing pad caused by the pad fabrication process, rather than discrete thickness variations at a small scale (e.g., less than 100 mils), such as grooves, perforations, or surface roughness).

Optionally, at least a portion of the polishing surface 24 can include a plurality of grooves 26 formed therein for carrying slurry. The grooves may be of nearly any pattern, such as concentric circles, straight lines, a cross-hatched, spirals, and the like. The grooves 26 can extend through about 20-80%, e.g., 25%, of the thickness of the covering layer 22. For example, in a polishing pad having an covering layer 22 that is 20 mils thick, the grooves 26 can have a depth D1 of about 5 mils.

The backing layer 20 is a compressible material that is softer and more compressible than the covering layer 22. For example, the backing layer can be a closed-cell foam, such as polyurethane or polysilicone with voids, so that under pressure the cells collapse and the backing layer compresses. It is permissible for the material of the backing layer 20 to be laterally displaced under pressure from the substrate. The backing layer 20 can have a hardness of 20 or less on the Shore A scale, such as 12 or less or 5 or less.

As mentioned above, the backing layer 20 should be more compressible than the covering layer 22. Compressibility may be measured as a percentage thickness change at a given pressure. For example, under a pressure of about 0.5 psi, the backing layer 20 can undergo about 3% compression. A suitable material for the backing layer is PORON 4701-30 from Rogers Corporation, in Rogers, Conn. (PORON is a trademark of Rogers Corporation).

In addition, the backing layer 20 is thick, e.g., 90 mils or more. For example, the backing layer may be about 95 to 500 mils thick, such as 95 to 200 mils, or 95 to 150 mils, or 95 to 125 mils. In particular, the backing layer 20 may be about 2 to 15 times as thick as the covering layer 22, e.g., 4.5 to 8 times as thick (particularly for a 20 mil thick covering layer).

In general, the thickness of the backing layer 20 is selected to ensure that, given the compressibility of the backing layer 20 and the rigidity of the covering layer 22, the covering layer will deflect at very low pressures, e.g., pressures of 0.5 psi or less, an amount at least equal to any non-uniformity in the thickness of the covering layer, e.g., about 2 mil (the non-uniformities are not shown in FIG. 3A). For example, a 100 mil thick backing layer should have a compression of at least 2% at 0.5 psi, whereas a 200 mil thick backing layer should have a compression of at least 1% at 0.5 psi.

Moreover, the backing layer should be sufficiently compressible that at the operating pressures of interest, e.g., at 1 psi or less, the polishing pad is below the maximum compressibility of the polishing pad. The backing layer can have a maximum compressibility greater than 10%, or greater than 20%. In one implementation, the backing layer can have a compressibility of 25% at pressures of 3 to 8 psi, with a maximum compressibility that is even higher.

In brief, at pressures of 1 psi or below (and possibly at 0.8 psi or below, or 0.5 psi or below, or 0.3 psi or below), the backing layer can have a product of the compressibility and thickness (C·D) that is greater than the non-uniformities in thickness of the cover layer. For example, at pressures of 0.8 psi or below (and possibly at 0.5 psi or below), the backing layer can have a product of the compressibility and thickness (C·D) of 2 mils or more (and possibly 3 mils or more).

Hydrostatic modulus K may be measured as applied pressure (P) divided volumetric strain ($\Delta V/V$), i.e., $K=PV/\Delta V$. Assuming that the backing layer undergoes pure compression (i.e., material is not displaced laterally under the applied pressure), then the hydrostatic modulus K equals the applied pressure divided by the compression ($\Delta D/D$). Thus, assuming that the backing layer undergoes at least 2% pure compression at 0.5 psi, the backing layer would have a compressibility modulus K of 25 or less. On the other hand, if even lower pressures are to be use, e.g., pressures of 0.1 psi, then the backing layer 20 should have a compressibility modulus of 5 or less. The backing layer may have a compressibility modulus K of 50 psi or less per psi of applied pressure in the range of 0.1 to 1.0 psi. Of course, if the material of the backing layer does undergo lateral displacement under compression, then the volumetric strain will be somewhat less than the compression, so the hydrostatic modulus may be somewhat higher.

Figure 3B:
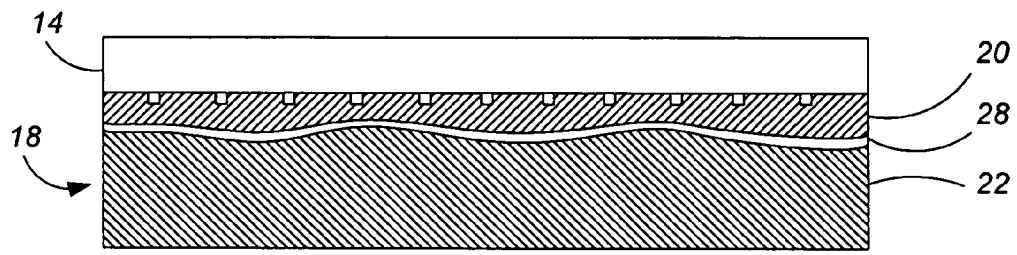
FIG. 3B is a schematic cross-sectional side view illustrating a substrate in contact with the polishing pad of FIG. 3A.

Referring to FIG. 3B, and without being limited to any particular theory, this configuration permits the downward force from the substrate to "flatten out" the covering layer at low pressures, even at pressures of 0.5 psi or less, such as 0.3 psi or less, such as 0.1 psi, and thus substantially compensate for the thickness non-uniformity of the polishing layer. For example, as illustrated, the variations in thickness of the covering layer 22 are absorbed by the compression of the backing layer 20 (for clarity, the variations are significantly exaggerated in FIG. 3B), so that the polishing surface remains in substantially uniform contact with the substantially planar substrate across the substrate surface. As a result, a uniform pressure can be applied to the substrate by the polishing pad, thereby improving polishing uniformity during low pressure polishing. Consequently, materials that require low-pressure polishing to avoid delamination, such as low-k dielectric materials, can be polished with an acceptable degree of uniformity.

In one implementation, the covering layer 22 can be manufactured, e.g., by a molding process, with grooves preformed in the upper surface of the covering layer. In a molding process, e.g., injection molding or compression molding, the pad material cures or sets in a mold that has indentations that form the grooves recess. Alternatively, the covering layer 22 can be manufactured by a more conventional technique, e.g., by skiving a thin sheet of pad material from a cast block. The grooves can then be formed by machining or milling the top surface of the covering layer, respectively.

Once the backing layer 20 and covering layer 22 have been manufactured, they can be secured, e.g., with a thin adhesive layer 28, such as a pressure-sensitive adhesive.

Figure 4:
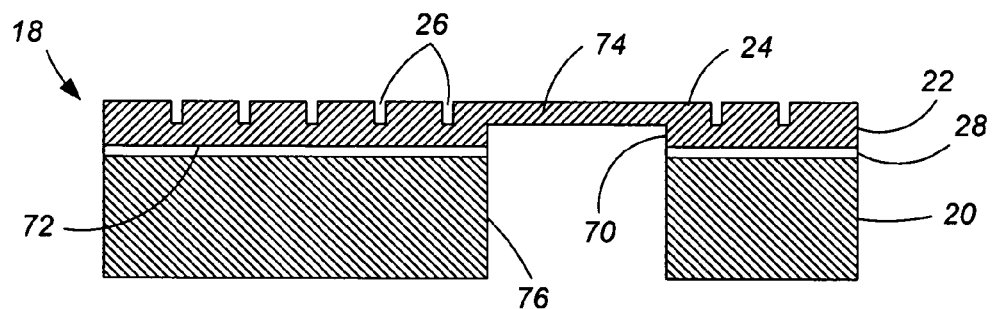
FIG. 4 is a schematic cross-sectional side view illustrating another implementation of the polishing pad.

Referring to FIG. 4, in another implementation, one or more recesses 70 can be formed in the bottom surface 72 of the covering layer 22 to provide a thin section 74. These recesses 70 can extend through 20 to 80%, e.g., 50%, of the thickness of the covering layer 22. For example, in a polishing pad having an covering layer 22 that is 20 mils thick, the recess 52 can have a depth of about 10 mils, leaving the thin section 74 with a thickness of about 10 mils. In addition, one or more apertures 76 can be formed in the backing layer 20 to permit sensor elements to extend through the backing layer 20 and partially into the covering layer 22.

In this implementation, the grooves 26 do not extend over the thin section 74 in the covering layer 22. Thus, the polishing surface 24 of the polishing pad includes portions with and without grooves, and the indentation is located in one of the portions without grooves. The grooves 26 can be sufficiently deep that they extend to or past the plane defined by the inner surface of the recess 70.

Figure 5:
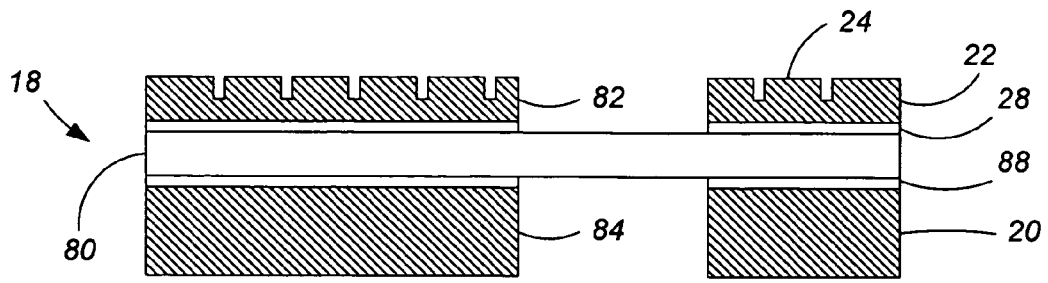
FIG. 5 is a schematic cross-sectional side view illustrating another implementation of the polishing pad.

Referring to FIG. 5, in another implementation, a thin sheet 80 of fluid-impermeable, tear-resistant material, such as Mylar, is positioned between the backing layer 20 and the covering layer 22. The sheet 80 may be secured to the cover layer 22 by an adhesive layer 28, or the covering layer 22 can be deposited directly on the sheet 80. The sheet 80 may be secured to the backing layer 20 by a thin adhesive layer 88. The sheet 80 can be a transparent material, and aligned portions 82 and 84 of the covering layer 22 and backing layer 20, respectively, can be removed to provide an optical port through the polishing pad.

Alternatively, a window could be formed in the polishing pad without use of the transparent sheet. For example, a solid transparent portion can be formed in the covering layer 22, and an aperture can be formed in the backing layer 20 that is aligned with the solid transparent portion. The transparent portion can be formed by cutting an aperture in the covering layer 22 and securing a transparent plug with an adhesive. Alternatively, the transparent portion can be formed by placing an insert of transparent material in a liquid pad material, curing the liquid pad material so that the insert is integrally molded into the block of solidified pad, and then skiving off the covering layer from the block.

Figure 6:
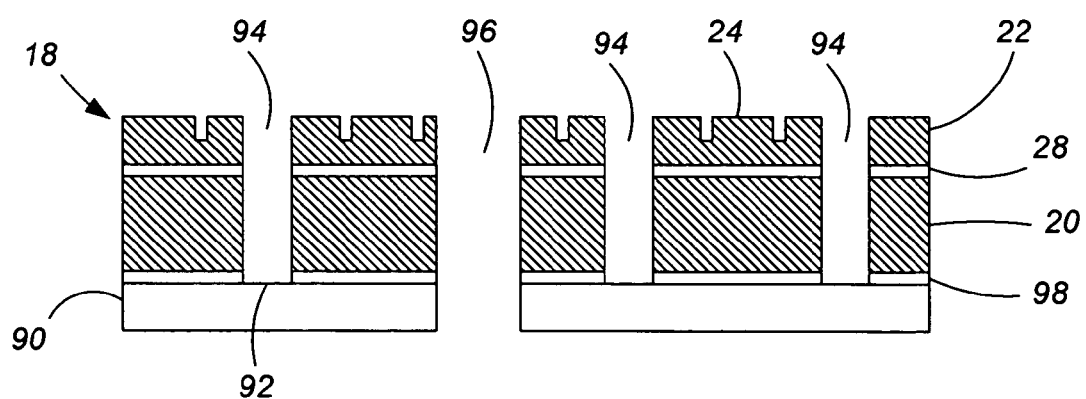
FIG. 6 is a schematic cross-sectional side view illustrating another implementation of the polishing pad.

Referring to FIG. 6, in another implementation, a thin metal layer 90, e.g., a conductive metal, such as stainless steel, e.g., SST 410, is secured to the bottom surface of the backing layer 20, e.g., with an adhesive layer 98. The metal layer 90 may also be magnetic. A plurality of perforations 94 extend through both the cover layer 22 and the backing layer 20 to expose the top surface 92 of the metal layer. In addition, one or more holes 96 extend through the cover layer 22, backing layer 20 and metal layer 90.

The various polishing pads of FIGS. 3-6 may be used for electrochemical processing, such as electrochemical mechanical polishing (ECMP) or simultaneous electrochemical deposition and polishing, in addition to chemical mechanical polishing.

In electrochemical mechanical polishing, conductive material, such as copper, is removed from the substrate surface by electrochemical dissolution while the substrate surface is concurrently polished. The substrate surface is placed in an electrolyte (which also serves as the polishing fluid), and a bias is applied between the substrate and a cathode that is in contact with the electrolyte. The ECMP can be performed at low or very low pressures, such as less than 1 psi, such 0.8 psi or less, or 0.5 psi or less, or 0.3 psi or less.

For example, referring to FIG. 6, the metal sheet 90 can be connected to a first electrode to serve as the cathode (the holes 94 provide access for the electrolyte to the metal sheet 90), and a second electrode can extend through the aperture 96 to contact the substrate so that the substrate serve as an anode.

In electrochemical deposition, the bias voltage is reversed, so that the substrate surface becomes the cathode, the electrode in contact with the electrolyte becomes the anode, and conductive material is electrodeposited onto the substrate. If this is performed while the substrate is contacting a moving processing pad at low pressure, then material will be preferentially deposited into any trenches in the dielectric layer.

A number of embodiments of the invention have been described. Nevertheless, it will be understood that various modifications may be made without departing from the spirit and scope of the invention.

For example, either the polishing pad, or the carrier head, or both can move to provide relative motion between the polishing surface and the substrate. The polishing pad can be a circular (or some other shape) pad secured to the platen, a tape extending between supply and take-up rollers, or a continuous belt. The polishing pad can be affixed on a platen, incrementally advanced over a platen between polishing operations, or driven continuously over the platen during polishing. The pad can be secured to the platen during polishing, or there could be a fluid bearing between the platen and polishing pad during polishing. An adhesive layer can be applied to the bottom surface of the polishing pad to secure the pad to the platen, and the adhesive layer can be covered by a removable liner. In addition, although terms of vertical positioning are used, it should be understood that the polishing surface and substrate could be held upside down, in a vertical orientation, or in some other orientation.

Accordingly, other embodiments are within the scope of the following claims.

What is claimed is:

1. A polishing pad, comprising:
a polishing layer having a polishing surface, a first thickness, a first compressibility, and a hardness between about 40 to 80 Shore D, the polishing layer having a thickness non-uniformity; and
a backing layer secured to the polishing layer, the backing layer having a second thickness greater than the first thickness and a second compressibility greater than the first compressibility;
wherein the first thickness, first compressibility, second thickness and second compressibility are such that the polishing surface deflects, under an applied pressure of 1 psi or less, more than the thickness non-uniformity of the polishing layer.

2. The polishing pad of claim 1, wherein the polishing surface deflects at least 2 mil under an applied pressure of 0.5 psi or less.

3. The polishing pad of claim 1, wherein the polishing surface deflects at least 2 mil under an applied pressure of 0.3 psi or less.

4. The polishing pad of claim 1, wherein the polishing surface deflects at least 2 mil under an applied pressure of about 0.1 psi.

5. The polishing pad of claim 1, wherein a product of the second compressibility and second thickness of the backing layer is at least 2 mils at a pressure of 0.8 psi or less.

6. The polishing pad of claim 5, wherein the backing layer has a hardness of 20 Shore A or less.

7. The polishing pad of claim 5, wherein the backing layer has a second thickness between about 90 and 150 mils.

8. The polishing pad of claim 7, wherein the polishing layer has a thickness less than 50 mils.

9. The polishing pad of claim 1, further comprising a plurality of grooves formed in the polishing surface.

10. The polishing pad of claim 1, further comprising a recess formed in a bottom surface of the polishing layer and an aperture in the backing layer aligned with the recess.

11. The polishing pad of claim 1, further comprising a fluid-impermeable layer between the polishing layer and the backing layer.

12. The polishing pad of claim 1, further comprising a metal sheet secured to the backing layer on a side opposite the polishing layer.

13. The polishing pad of claim 12, further comprising a plurality of holes formed through the polishing layer and the backing layer to expose the metal sheet.

14. The polishing pad of claim 1, wherein the polishing layer includes polyurethane.

15. The polishing pad of claim 14, wherein the polishing layer consists of cast polyurethane with embedded hollow microspheres.

16. A polishing pad, comprising:
a polishing layer having a polishing surface, a hardness between about 40 and 80 Shore D, and a thickness of about 25 mils or less; and
a backing layer secured to the polishing layer, the backing layer being more compressible than the polishing layer and having a thickness between about 90 and 150 mils,
wherein the backing layer has a compressibility of 2% or more at 0.5 psi.

17. A polishing pad, comprising:
a polishing layer having a polishing surface, a hardness between about 40 and 80 Shore D, a first compressibility and a first thickness; and
a backing layer secured to the polishing layer, the backing layer having a second compressibility greater than the first compressibility and a second thickness of 90 mils or more, the backing layer further having a product of the second thickness and second compressibility of 2 mils or more, and the ratio of the second thickness to the first thickness being between about 4.5 and 8.

18. A substrate processing apparatus, comprising:
a pad support;
a processing pad held by the polishing pad support, the processing pad having a covering layer with an outer surface, a first thickness, a first compressibility, a hardness between about 40 to 80 Shore D, and a thickness non-uniformity, and a backing layer secured to the covering layer, the backing layer having a second thickness greater than the first thickness and a second compressibility greater than the first compressibility, wherein the first thickness, first compressibility, second thickness and second compressibility are such that the polishing surface deflects more than the thickness non-uniformity of the covering layer under an applied pressure of 1 psi or less;
a carrier head to hold a substrate in contact with the polishing pad;
a supply of processing fluid; and
a motor connected to at least one of the pad support and the carrier head to cause relative motion between the processing pad and the substrate.

19. The apparatus of claim 18, further comprising an electrode positioned to contact the substrate, a cathode contacting the processing fluid, and a power supply coupled between the electrode and the cathode to create a bias.

20. A processing pad, comprising:
a covering layer having an outer surface, a first thickness, a first compressibility, and a hardness between about 40 to 80 Shore D, the covering layer having a thickness non-uniformity; and
a backing layer secured to the covering layer, the backing layer having a second thickness greater than the first thickness and a second compressibility greater than the first compressibility;
wherein the first thickness, first compressibility, second thickness and second compressibility are such that the exposed surface deflects, under an applied pressure of 1 psi or less, more than the thickness non-uniformity of the covering layer.

21. A processing pad, comprising:

a covering layer having an outer surface, a first thickness, a first compressibility, and a hardness between about 40 to 80 Shore D, the covering layer having a thickness non-uniformity; and a backing layer secured to the covering layer, the backing layer having a second thickness greater than the first thickness and a second compressibility greater than the first compressibility;

wherein the first thickness, first compressibility, second thickness and second compressibility are such that the outer surface deflects sufficiently, under an applied pressure of 1 psi or less from a substantially planar substrate, that the outer surface remains in substantially uniform contact with the substrate across the substrate surface.

22. A processing pad, comprising:

a covering layer having an outer surface, a first thickness, a first compressibility, and a hardness between about 40 to 80 Shore D, the covering layer having a thickness non-uniformity; and a backing layer secured to the covering layer, the backing layer having a second thickness greater than the first thickness and a second compressibility greater than the first compressibility;

wherein the first thickness, first compressibility, second thickness and second compressibility are such that the outer surface deflects sufficiently, under an applied pressure of 1 psi or less, to substantially compensate for the thickness non-uniformity of the polishing layer.

* * * * *

UNITED STATES PATENT AND TRADEMARK OFFICE
CERTIFICATE OF CORRECTION

PATENT NO. : 7,654,885 B2 Page 1 of 1
APPLICATION NO. : 10/956617
DATED : February 2, 2010
INVENTOR(S) : Tsai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Twenty-third Day of November, 2010

David J. Kappos
*Director of the United States Patent and Trademark Office*